United States Patent
Miyauchi et al.

(10) Patent No.: US 9,219,284 B2
(45) Date of Patent: Dec. 22, 2015

(54) FUEL CELL SYSTEM AND OPERATION METHOD THEREOF WHICH ENSURES THE SYSTEM WILL PERFORM NORMAL OPERATION AFTER OPERATING IN A SPECIAL OPERATION MODE

(75) Inventors: Shinji Miyauchi, Kyoto (JP); Motomichi Katou, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 334 days.

(21) Appl. No.: 13/884,466

(22) PCT Filed: Jul. 13, 2011

(86) PCT No.: PCT/JP2011/004015
§ 371 (c)(1),
(2), (4) Date: May 9, 2013

(87) PCT Pub. No.: WO2012/114391
PCT Pub. Date: Aug. 30, 2012

(65) Prior Publication Data
US 2013/0337352 A1    Dec. 19, 2013

(30) Foreign Application Priority Data
Feb. 24, 2011    (JP) .................... 2011-037833

(51) Int. Cl.
*H01M 8/04*    (2006.01)

(52) U.S. Cl.
CPC ...... *H01M 8/04223* (2013.01); *H01M 8/04955* (2013.01); *H01M 2250/10* (2013.01); *Y02B 90/14* (2013.01); *Y02E 60/50* (2013.01)

(58) Field of Classification Search
CPC .................. H01M 8/04223; H01M 8/04255; H01M 2250/10; Y02E 60/50; Y02B 90/14
See application file for complete search history.

(56) References Cited

U.S. PATENT DOCUMENTS 5,467,265 A    11/1995    Yamada et al.
2012/0321977 A1    12/2012    Katou et al.

FOREIGN PATENT DOCUMENTS

JP    06-028536 U    4/1994
JP    09-318136 A    12/1997
(Continued)

OTHER PUBLICATIONS

International Search Report issued in International Patent Application No. PCT/JP2011/004015 mailed on Oct. 18, 2011.
(Continued)

*Primary Examiner* — Raymond Alejandro
(74) *Attorney, Agent, or Firm* — McDermott Will & Emery LLP

(57) ABSTRACT

A controller in a fuel cell system operates a fuel cell in a normal mode or in a special mode. In the normal mode, the fuel cell is operated to satisfy at least one of a first operation condition and a second operation condition, under the first operation condition an operation time of the fuel cell per unit period is equal to or shorter than a unit allowable operation time, under the second operation condition the number of times of operation of the fuel cell per unit time is equal to or less than a unit allowable number of times of operation, and in the special mode, the fuel cell is operated without being limited by at least one of the first operation condition and the second operation condition.

10 Claims, 11 Drawing Sheets

(56) References Cited

FOREIGN PATENT DOCUMENTS

| | | | |
|---|---|---|---|
| JP | 2005-063903 A | 3/2005 | |
| JP | 2006-283622 A | 10/2006 | |
| JP | 2007-280650 * | 10/2007 | .............. H01M 8/04 |
| JP | 2007-280650 A | 10/2007 | |
| JP | 2007-323843 A | 12/2007 | |
| JP | 2010-067553 A | 3/2010 | |

OTHER PUBLICATIONS

International Preliminary Report on Patentability issued in International Patent Application No. PCT/JP2011/004015 mailed on Mar. 7, 2013.

PCT/IPEA/408 issued in International Patent Application No. PCT/JP2011/004015 mailed on Dec. 11, 2012.

Extended European Search Report issued in European Application No. 11859057.9 dated Mar. 13, 2014.

* cited by examiner

FUEL CELL SYSTEM AND OPERATION METHOD THEREOF WHICH ENSURES THE SYSTEM WILL PERFORM NORMAL OPERATION AFTER OPERATING IN A SPECIAL OPERATION MODE

RELATED APPLICATIONS

This application is the U.S. National Phase under 35 U.S.C. §371 of International Application No. PCT/JP2011/004015, filed on Jul. 13, 2011, which in turn claims the benefit of Japanese Application No. 2011-037833, filed on Feb. 24, 2011, the disclosures of which Applications are incorporated by reference herein.

TECHNICAL FIELD

The present invention relates to a fuel cell system including a fuel cell for generating electric power using a fuel gas and an oxidizing gas, and a controller. Particularly, the present invention relates to control for a trial operation (initial run), an operation performed at a time point of maintenance, etc., in a fuel cell system which is operated based on an allowable operation time per unit time derived from a total durable operation time or an allowable number of times of operation per unit time derived from a total durable number of times of operation.

BACKGROUND ART

An exemplary conventional fuel cell system is operated based on an operation plan designed to surely actuate a fuel cell for durable years which are expected by users. For example, Patent Literature 1 discloses a fuel cell system in which to enable a power generation operation for a time period longer than durable years (e.g., 10 years) of the fuel cell which are expected by the users, an allowable operation time per predetermined period is planned based on a total durable operation time (e.g., about 40000 h) of the fuel cell and the fuel cell is operated based on the operation plan (e.g., see Patent Literature 1).

FIG. 11 is a schematic view showing a configuration of the conventional fuel cell system disclosed in Patent Literature 1. In this fuel cell system, a controller 50 creates an operation plan of a fuel cell 15 in such a manner that an allowable operation time of the fuel cell 15 is set based on a past actual operation performance stored in a data storage means. The operation of the fuel cell 15 is initiated based on this operation plan. Then, after a passage of a predetermined unit time, an actual operation time is compared to an allowable operation time, and a difference value between the actual operation time and the allowable operation time is calculated if the actual operation time is less than the allowable operation time. Then, the operation plan already created is updated into a new operation plan which is a sum of the difference value and an allowable operation time in a next time.

CITATION LISTS

Patent Literature

Patent Literature 1: Japanese Laid-Open Patent Application Publication No. 2007-323843

SUMMARY INVENTION

Technical Problem

However, in the configuration of the conventional fuel cell system, for example, in a trial operation at a time of installation of the fuel cell system or at a time point of maintenance of the fuel cell system, the operation of the fuel cell system is limited to an operation within an allowable operation time set for a normal power generation operation used by a user. Because of this, for example, in a case where a remaining time of an allowable operation time allocated to that day is lessened, because of the power generation operation performed by the user's use, there is a possibility that the trial operation of the fuel cell system cannot be performed sufficiently. On the other hand, in a case where the allowable operation time allocated to that day has run out because of the trial operation, this may lead to a situation in which the user who takes over that fuel cell system thereafter will not be able to operate the fuel cell system for power generation until a next day comes.

The present invention is directed to solving the above described problem, and an object of the present invention is provide a fuel cell system which is capable of performing a trial operation after installation of the fuel cell system or after maintenance of the fuel cell system and ensuring a power generation operation time for a user, even after the trial operation, irrespective of an operation time of a power generation operation which is on the basis of a use state of the user.

Solution to Problem

A fuel cell system of the present invention comprises a fuel cell for generating electric power using a fuel gas and an oxidizing gas; a controller for controlling at least start-up and shut-down of the fuel cell; and an auxiliary device, at least shut-down and start-up of which is controlled by the controller; wherein the controller operates the fuel cell in a normal mode or in a special mode which is switched by the controller; in the normal mode, the fuel cell is operated so as to satisfy at least one of a first operation condition and a second operation condition, the first operation condition being a condition in which an operation time of the fuel cell per unit period is equal to or shorter than a unit allowable operation time defined based on a total durable operation time of at least one of the fuel cell and the auxiliary device, the second operation condition being a condition in which the number of times of operation of the fuel cell per unit time is equal to or less than a total unit allowable number of times of operation defined based on a durable number of times of operation of at least one of the fuel cell and the auxiliary device, and in the special mode, the fuel cell is operated without being limited by at least one of the first operation condition and the second operation condition.

In description give below, for easier explanation, the operation in a case where the user normally uses the fuel cell is referred to as "normal operation." This "normal operation" includes a steady operation in which the fuel cell generates electric power, an operation during start-up for placing the fuel cell in a shut-down state to a power generation state, and an operation during shut-down for placing the fuel cell in the power generation state to the shut-down state. For example, an operation differentiated from the "normal operation," such as a trial operation carried out by an operator at a time point of installation or at a time point of maintenance, is referred to as "special operation."

In the above described configuration, during the normal operation in a case where the user uses the fuel cell, the fuel cell is operated in the normal mode according to the first operation condition and/or the second operation condition, it is ensured that the fuel cell can be used over the durable years. On the other hand, during a special operation in a case where the operator performs a trial operation, the fuel cell is operated in the special mode without being limited by the operation conditions. Thus, the operation can be continued as necessary, and an appropriate trial operation can be carried out. Since the operation is not limited by the operation conditions, during a time period in which the special mode is continued after the trial operation, the user can actuate the fuel cell system to perform the normal operation such as a power generation operation.

The controller may switch the normal mode to the special mode and operate the fuel cell in the special mode, in the same unit period as a unit period in which the fuel cell is operated in the normal mode; and wherein after the unit period in which the fuel cell is operated in the special mode ends, the controller may switch the special mode to the normal mode and operates the fuel cell in the normal mode in a next unit period.

In the above described configuration, for example, since the normal mode is switched to the special mode in the same day (the same unit period), the special operation can be performed irrespective of the normal operation time before switching from the normal mode to the special mode. After the special operation is terminated, the special mode is continued until a next day (next unit period) comes. Therefore, the user can cause the fuel cell to perform the normal operation. On the next day, the special mode is automatically switched to the normal mode. Therefore, on the next day, it becomes possible to implement an appropriate operation plan in which the operation time is limited based on the first condition or the second condition and durable years of the fuel cell are considered.

The fuel cell system may further comprise a main power supply switch for switching supply and cut-off of electric power from a utility power supply to at least the fuel cell and the auxiliary device; wherein when the main power supply switch may be switched from OFF to ON and the utility power supply starts supplying of the electric power, the controller permits the fuel cell to be operated in the special mode until an end of a unit period in which the main power supply switch is switched from OFF to ON.

In the above described configuration, when the operator switches a main power supply of the fuel cell system from OFF to ON, in a case where a trial operation is carried out by the operator at a time point of installation or at a time point of maintenance, the fuel cell system enters the special mode. Therefore, the special operation such as the trial operation can be carried out irrespective of limitations of time in the normal mode.

The fuel cell system may further comprise an operator manipulation section manipulated by an operator to start the operation of the fuel cell in the special mode; and when the operator manipulation section is manipulated by the operator and the operation in the special mode is started, the controller may permit the fuel cell to be operated in the special mode until an end of a unit period in which the operator manipulation section is manipulated by the operator.

In the above described configuration, by manipulating the operator manipulation section, in a case where the special operation is performed at a time point of installation or at a time point of maintenance of the fuel cell system, the fuel cell system can be switched to the special mode.

The fuel cell system may further comprise a user manipulation section including a plurality of switches including a switch manipulated by a user to command an operation condition of the fuel cell; wherein when a predetermined switch in the user manipulation section is pushed for a predetermined long time, or when predetermined plural switches in the user manipulation section are pushed simultaneously, the controller may permit the fuel cell to be operated in the special mode until an end of a unit period in which the predetermined switch is pushed for a long time or the predetermined plural switches are pushed simultaneously.

In the above described configuration, in a case where the special operation is performed, the fuel cell system can be switched to the special mode, by pushing the predetermined switch for a long time or by pushing the predetermined plural switches simultaneously.

When the controller executes the operation in the special mode, the controller may permit the fuel cell to be operated such that the unit allowable operation time is exceeded, before a passage of an allowable special mode time set shorter than the unit period after the special mode is started, or the controller may permit the fuel cell to be operated such that the unit allowable number of times of operation is exceeded from when the special mode is started until a predetermined allowable number of times of the special mode is used up.

In the above described configuration, the fuel cell can be operated in the special mode without being limited by the unit allowable operation time or the unit allowable number of times of operation, until a time point defined by the allowable special mode time or the allowable number of times of the special mode after the fuel cell system has been switched to the special mode. Therefore, the operator can cause the fuel cell system to perform the special operation, until this time point, and the user can cause the fuel cell system to perform the normal operation after the special operation is terminated.

The controller may store an accumulated excess time derived by accumulating unit excess times in unit periods having passed, each of the unit excess times exceeding the unit allowable operation time in one unit period, and an accumulated excess number of times derived by accumulating unit excess number of times in unit periods having passed, each of the unit excess number of times exceeding the unit allowable number of times of operation in one unit period; and in at least one of a case where the accumulated excess time has reached an upper-limit accumulated excess time and a case where the accumulated excess number of times has reached the upper-limit accumulated excess number of times, the controller may forcibly switch the special mode to the normal mode.

In the above described configuration, even when the accumulated excess time or the accumulated excess number of times increases because of the fact that the operation in the special mode occurs frequently, the special mode is switched forcibly to the normal mode if the accumulated excess time or the accumulated excess number of times has reached the threshold (upper-limit accumulated excess time or upper-limit accumulated excess number of times). Thus, it becomes possible to suppress a continued operation for a long time and guarantee the use of the fuel cell over durable years.

The fuel cell system may further comprise a user manipulation section including a plurality of switches including a switch manipulated by the user to command an operation condition of the fuel cell; wherein the user manipulation section may include: an output section for outputting a voice or displaying information commanding switching from the special mode to the normal mode, in response to a command issued by the controller, in at least one of a case where the accumulated excess time has reached the predetermined upper-limit accumulated excess time and a case where the accumulated excess number of times has reached the predetermined upper-limit accumulated excess number of times, and the controller forcibly switches the special mode to the normal mode.

In the above described configuration, in a case where the special mode is switched forcibly to the normal mode because of the fact that the operation in the special mode occurs frequently, this information can be notified to enable the user to know it. Since the information is notified to the user, the user can easily understand the operation time of the fuel cell or the number of times of operation of the fuel cell is limited based on the durable years. Therefore, the user can approve the operation of the fuel cell system performed based on the operation plan.

The unit allowable operation time may be set shorter for a time period in one year in which a heat demand is less.

For example, in a summer season in which the heat demand amount is less in a winter season, the unit allowable operation time is set shorter than in the winter season. In this setting, a long-time operation of the fuel cell system can be implemented according to the user's demand in the winter season, while a use time of the fuel cell system can be suppressed in the summer season. Thus, durable years can be guaranteed.

The auxiliary device may include a hydrogen generator for generating a fuel gas supplied to the fuel cell.

A temperature difference between the power generation state and the shut-down state is relatively great in the hydrogen generator. Because of this, as the number of times of operation of the hydrogen generator increases, a fatigue of a casing which is caused by thermal expansion and contraction increases. Since the number of times of operation of the hydrogen generator assumed as the auxiliary device can be controlled based on the operation plan, the durable years of the hydrogen generator can be guaranteed.

A method of operating a fuel cell system including a fuel cell for generating electric power using a fuel gas and an oxidizing gas, and an auxiliary device, comprises the steps of: operating the fuel cell in a normal mode in which the fuel cell is operated so as to satisfy at least one of a first operation condition and a second operation condition, the first operation condition being a condition in which an operation time of the fuel cell per unit period is equal to or shorter than a unit allowable operation time defined based on a total durable operation time of at least one of the fuel cell and the auxiliary device, the second operation condition being a condition in which the number of times of operation of the fuel cell per unit time is equal to or less than a total unit allowable number of times of operation defined based on a total durable number of times of operation of at least one of the fuel cell and the auxiliary device; operating the fuel cell in a special mode in which the fuel cell is operated without being limited by at least one of the first operation condition and the second operation condition; and switching the operation between the normal mode and the special mode.

Advantageous Effects of the Invention

In accordance with the fuel cell system of the present invention, the normal operation of the fuel cell system is carried out under the normal mode in which the operation is limited within the unit allowable operation time defined by a total durable operation time or a unit allowable number of times of operation defined by a total durable number of times of operation. On the other end, in the case of the special operation different from the normal operation, the fuel cell system is permitted to be operated in the special mode without being limited by the unit allowable operation time or the unit allowable number of times of operation.

Therefore, in the normal mode, by limiting the operation time or the number of times of operation, the durable years of the fuel cell system can be guaranteed. On the other hand, in the special mode, without being limited by the operation time or the number of times of operation, the special operation such as the appropriate trial operation can be performed. After the special operation is terminated in the special mode, the normal operation can be continued until a predetermined timing. This makes it possible to prevent that the normal operation cannot be implemented thereafter because of the trial operation etc. That is, just after the special operation such as the trial operation, it can be ensured that the user causes the fuel cell system to perform the normal operation.

DESCRIPTION OF THE EMBODIMENTS

Hereinafter, embodiments of the present invention will be described with reference to the drawings. The present invention is not limited by the embodiments described below.

Embodiment 1

Figure 1:
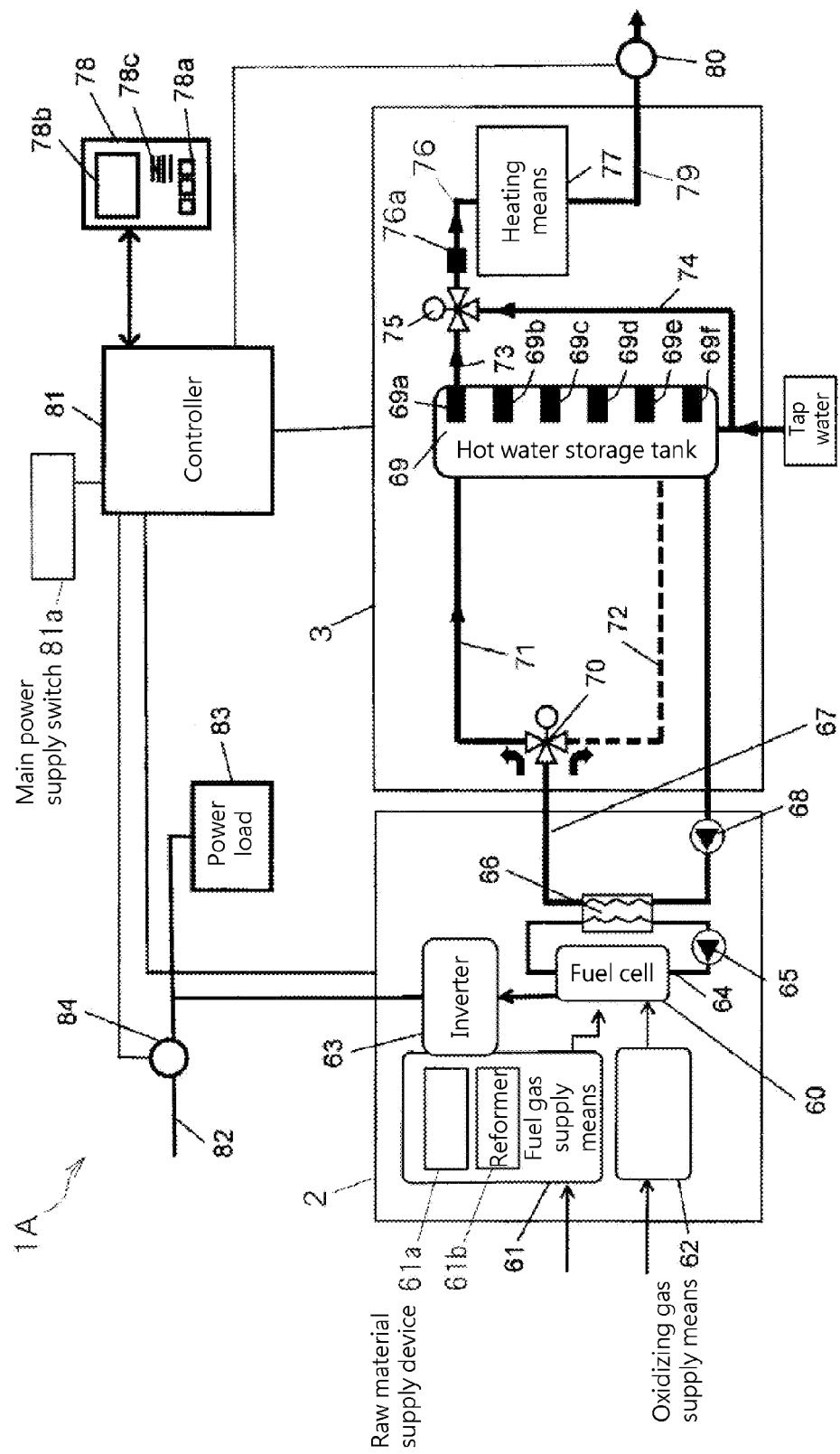
FIG. 1 is a schematic view showing a configuration of a fuel cell system according to Embodiment 1 of the present invention.

FIG. 1 is a schematic view showing a configuration of a fuel cell system according to Embodiment 1 of the present invention. As shown in FIG. 1, a fuel cell system 1A according to the present embodiment includes a power generation system 2 which includes a fuel cell 60 for performing power generation as its main action, and an exhaust heat recovery system 3 for recovering heat generated in power generation of the power generation system 2.

The power generation system 2 includes in addition to the fuel cell 60, a fuel gas supply means 61, an oxidizing gas supply means 62, an inverter 63, a heat exchanger 66, etc. More specifically, the fuel gas supply means 61 is connected to the fuel cell 60 via a fuel gas supply pipe. The fuel gas supply means 61 includes a raw material supply device 61a connected to a raw material supply source such as a city gas infrastructure, and a reformer 61b. The reformer 61b reforms the fuel gas supplied from the raw material supply device 61a into a reformed gas which is a hydrogen-containing gas. This reformed gas is supplied to the fuel cell 60.

An oxidizing gas supply means 62 is coupled to the fuel cell 60 via an oxidizing gas supply pipe. The oxidizing gas supply means 62 is constituted by, for example, blower, and supplies air (oxidizing gas) taken from outside to the fuel cell 60. The fuel cell 60 generates electricity through an electrochemical reaction using the fuel gas and the oxidizing gas supplied as described above. Its electric power is sent to an inverter 63. An output of the inverter 63 is interactively connected to a utility power supply 82 connected to a power load 83 used by the user. Therefore, DC power generated in the fuel cell 60 is converted into AC power by the inverter 63 and consumed in the power load 83 according to the user's demand.

A cooling water path 64 forming a closed circuit in which cooling water circulates is connected to the fuel cell 60. A cooling water circulating pump 65 and a heat exchanger 66 are provided on the cooling water path 64. An exhaust heat recovery pipe 67 through which cooling water flows is inserted through the heat exchanger 66 independently of the cooling water path 64. A hot water pump 68 is provided on the exhaust heat recovery pipe 67. Therefore, by actuating the cooling water circulating pump 65, heat generated by the power generation in the fuel cell 60 is recovered by the cooling water within the cooling water path 64, and further transferred to the cooling water in the exhaust heat recovery pipe 67 in the heat exchanger 66.

Next, the exhaust heat recovery system 3 will be described. The exhaust heat recovery system 3 includes a hot water storage tank 69 having a vertical predetermined dimension. The hot water storage tank 69 is almost filled with the cooling water. Recovery ports of the cooling water are provided on an upper portion and a lower portion of the hot water storage tank 69, respectively. A downstream end of a pipe 71 is coupled to the recovery port at the upper portion, while a downstream end of a pipe 72 is coupled to the recovery port at the lower portion. An upstream end of the pipe 71 and an upstream end of the pipe 72 are coupled to a downstream end of the exhaust heat recovery pipe 67 via a three-way valve 70. The three-way valve 70 is configured to selectively cause either one of the pipes 71 and 72 to communicate with the exhaust heat recovery pipe 67. When a temperature of the cooling water sent through the exhaust heat recovery pipe 67 is equal to or higher than a predetermined threshold, the three-way valve 70 causes the upper pipe 71 to communicate with the exhaust heat recovery pipe 67, while when the temperature of the cooling water sent through the exhaust heat recovery pipe 67 is lower than the predetermined threshold, the three-way valve 70 causes the lower pipe 72 to communicate with the exhaust heat recovery pipe 67. An upstream end of the exhaust heat recovery pipe 67 is connected to an outlet port of the cooling water provided at the lower portion of the hot water storage tank 69.

In the above described configuration, the cooling water in the exhaust heat recovery pipe 67 which has raised its temperature by heat generated in the power generation in the fuel cell 60 is recovered to flow to an upper layer in the hot water storage tank 69 through the pipe 71 when the temperature is equal to or higher than the predetermined threshold, whereas the cooling water in the exhaust heat recovery pipe 67 is recovered to flow to a lower layer in the hot water storage tank 69 through the pipe 72 when the temperature is lower than the predetermined threshold. Inside of the hot water storage tank 69, the cooling water with a relatively higher temperature flows toward the upper layer. The cooling water is recovered to flow to the upper layer or to the lower layer depending on the temperature of the cooling water as described above. Thus, higher-temperature water is held in the upper layer inside of the hot water storage tank 69, while lower-temperature water is held in the lower layer inside of the hot water storage tank 69. The relatively lower-temperature cooling water in the lower layer inside of the hot water storage tank 69 can be supplied to the heat exchanger 66 via the exhaust heat recovery pipe 67.

A discharge outlet of the cooling water is provided at the upper portion of the hot water storage tank 69. An upstream end of a pipe 73 is connected to the discharge outlet. A downstream end of the pipe 73 is connected to an input port of a mixing valve 75. A pipe for guiding tap water is connected to the lower portion of the hot water storage tank 69. A downstream end of a pipe 74 which branches from the pipe for guiding tap water is connected to another input port of the mixing valve 75. A pipe 76 extends from an output port of the mixing valve 75. A downstream end of the pipe 76 is connected to a heating means 77. A pipe 79 extending from the heating means 77 is configured to reach a faucet.

Therefore, the mixing valve 75 mixes the relatively higher-temperature hot water stored in the upper layer of the hot water storage tank 69 and the lower-temperature tap water in a proper ratio, and thus, hot water with a desired temperature can be output from the faucet. In a case where it is necessary to output hot water with a temperature that is equal to or higher than that of the upper layer in the hot water storage tank 69, the heating means 77 performs heating, so that the hot water with a desired temperature can be output. A plurality of temperature sensors 69$a$ to 69$f$ are attached in a vertical direction on the hot water storage tank 69. Based on the temperatures detected by the temperature sensors 69$a$ to 69$f$, a level to which the hot water with a higher temperature is stored, can be detected. Therefore, based on this, an amount of remaining hot water can be detected. In a case where the hot water is output from the faucet, makeup tap water is supplied as cooling water through the lower portion of the hot water storage tank 69.

The fuel cell system 1A further includes a controller 81 and a user manipulation device 78. The controller 81 is connected to an electric power supply via a main power supply switch 81$a$. In a state in which the main power supply switch 81$a$ is ON, the overall operation of the fuel cell system 1A including the power generation system 2 and the exhaust heat recovery system 3 is controlled. For example, the controller 81 adjusts an amount of the fuel gas supplied from the fuel gas supply means 61, and an amount of the oxidizing gas supplied from the oxidizing gas supply means 62, to control an amount of power generation in the fuel cell 60. In addition, the controller 81 controls an operation of the cooling water circulating pump 65, an operation of the hot water pump 68, an operation of the three-way valve 70, an operation of the mixing valve 75, an operation of the heating means 77, etc.

A mixing temperature detecting means 76$a$ is attached on a portion of the pipe 76 which is located downstream of the mixing valve 75. A heat load detecting means 80 for detecting a heat demand amount (i.e., usage heat amount per unit time in a heat load) is attached on a pipe 79 leading to the faucet. A power load detecting means 84 is attached on the utility power supply 82 to measure electric power at a power reception point corresponding to the power load 83. Signals detected by the detecting means 76$a$, 80, and 84, and signals detected by the temperature sensors 69$a$ to 69$f$ are sent to the controller 81.

Generally, it is assumed that a maintenance operator of a maker or the like, an operator of installation of the system 1A, rather than the user who utilizes the fuel cell system 1A, manipulates the controller 81 and the main power supply switch 81$a$.

The user manipulation device 78 is generally called a remote controller. The user manipulation device 78 is generally assumed to be manipulated by the general user, and is attached on a wall surface or the like inside of a house. The user manipulation device 78 includes a manipulation section 78a composed of a plurality of switches and the like, a display section (output section) 78b composed of a liquid crystal display, etc., and a notification section (output section) 78c composed of a speaker, etc., and is communicatively coupled to the controller 81.

The manipulation section 78a is manipulated by the user, to make settings such as start and stop of power generation in the fuel cell 60, a hot water temperature, and a time at which the hot water is supplied to a bath. For example, in a case where start of power generation is commanded by the manipulation of the manipulation section 78a, the controller 81 receives this command and starts-up the power generation system 2 to start the power generation. In a case where the hot water temperature is set by the manipulation of the manipulation section 78a and the hot water is output from the faucet, the controller 81 appropriately controls the mixing valve 75 and the heating means 77, based on a difference between a value of the hot water detected by the mixing temperature detecting means 76a and the set temperature of the hot water.

If the detected value of the hot water is higher than the set hot water temperature, the controller 81 controls the mixing valve 75 so that a ratio of the tap water supplied from the pipe 74 increases. On the other hand, if the detected value of the hot water is lower than the set hot water temperature, the controller 81 controls the mixing valve 75 so that the ratio of the tap water supplied from the pipe 74 decreases. Furthermore, if the detected value of the hot water is still lower than the set hot water temperature, even after the ratio of the tap water supplied from the pipe 74 is set to zero, the controller 81 actuates the heating means 77 to raise the hot water temperature up to the set temperature.

The display section 78b is able to display various information such as the amount of electric power generated in power generation in the fuel cell 60, error information, and the remaining hot water amount, by means of characters, symbols, illustrations, etc. In addition, the display section 78b is able to display an accumulated operation time for that day, accumulated operation times for a most recent week, for a most recent month, and for a most recent year, an accumulated operation time after installation of the system 1A in such a way that these information are appropriately switched.

The notification section 78c is able to output a voice, an alarm sound, etc. For example, the notification section 78c is able to output information indicating that filling of the hot water in the bath is completed, by a voice, or the like, to enable the user to known this information. Or, the notification section 78c is able to notify the user of various information, for example, output a state of the fuel cell system 1A, by a voice, or the like. The notification section 78c outputs the information or the display section 78b displays various information in response to the user's manipulation with respect to the manipulation section 78a, or a command issued by the controller 81.

Figure 2:
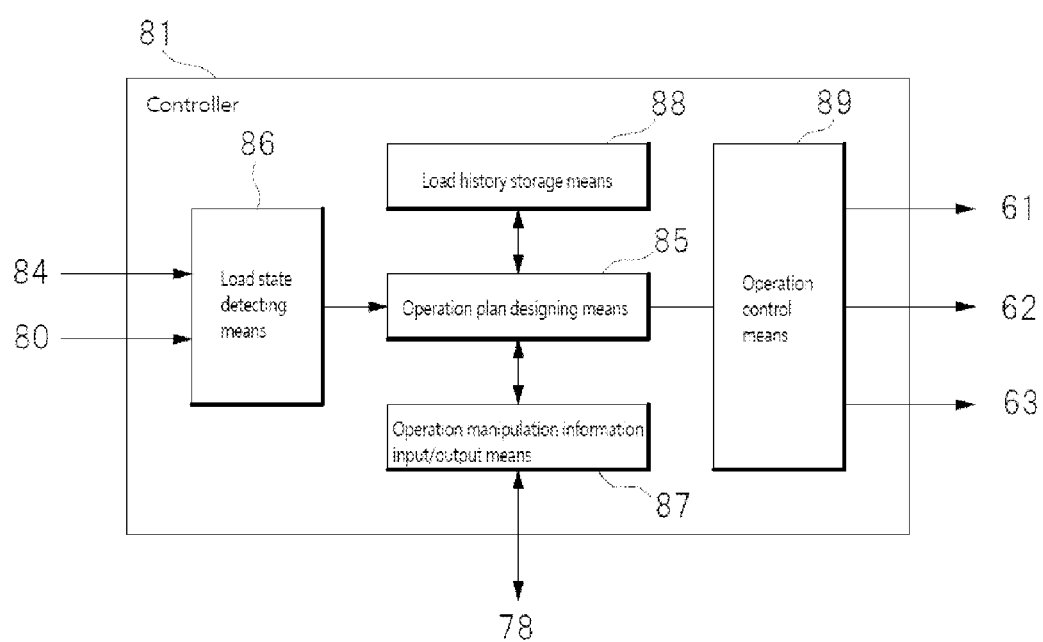
FIG. 2 is a functional block diagram showing a configuration of a controller in the fuel cell system of FIG. 1.

FIG. 2 is a functional block diagram showing a configuration of the controller 81. As shown in FIG. 2, the controller 81 includes as its functions an operation plan designing means 85, a load state detecting means 86, a manipulation information input/output means 87, a load history storing means 88, and an operation control means 89.

The operation plan designing means 85 is configured to design the operation plan in the fuel cell system 1A. As will be described later, the operation plan designing means 85 sets, for example, a time for which the fuel cell system 1A can be operated for 1 day in every season, etc., based on a total durable operation time or a total durable number of times of operation, which is set as specification of the fuel cell 60 or another auxiliary device (e.g., reformer 61b or the like) (see FIG. 3). The load state detecting means 86 obtains a detected value from the heat load detecting means 80 and a detected value of the power load detecting means 84, and outputs the detected values to the operation plan designing means 85. The operation plan designing means 85 updates the operation plan already designed, by appropriately modifying the operation plan, based on the obtained detected value relating to the load.

The manipulation information input/output means 87 receives various manipulation information input by the user's manipulation with respect to the user manipulation device 78, or outputs to the user manipulation device 78 information to be displayed on the display section 78b or to be notified on the notification section 78c in the user manipulation device 78. The load history storing means 88 stores information indicating relations between a power demand amount and a heat demand amount which are obtained via the load state detecting means 86 and times corresponding to these demands. This information is appropriately referred to by the operation plan designing means 85. Specifically, the operation plan designing means 85 predicts a power demand amount and a heat demand amount which change with time in the future based on the information indicating the relation between past demands and times which is stored in the load history storing means 88 and updates the operation plan.

The operation control means 89 controls the operation of the power generation system 2 including the fuel gas supply means 61, the oxidizing gas supply means 62, and the inverter 63, and controls the operation of the exhaust heat recovery system 3, based on the operation plan designed by the operation plan designing means 85.

[Operation Plan]

Figure 3:
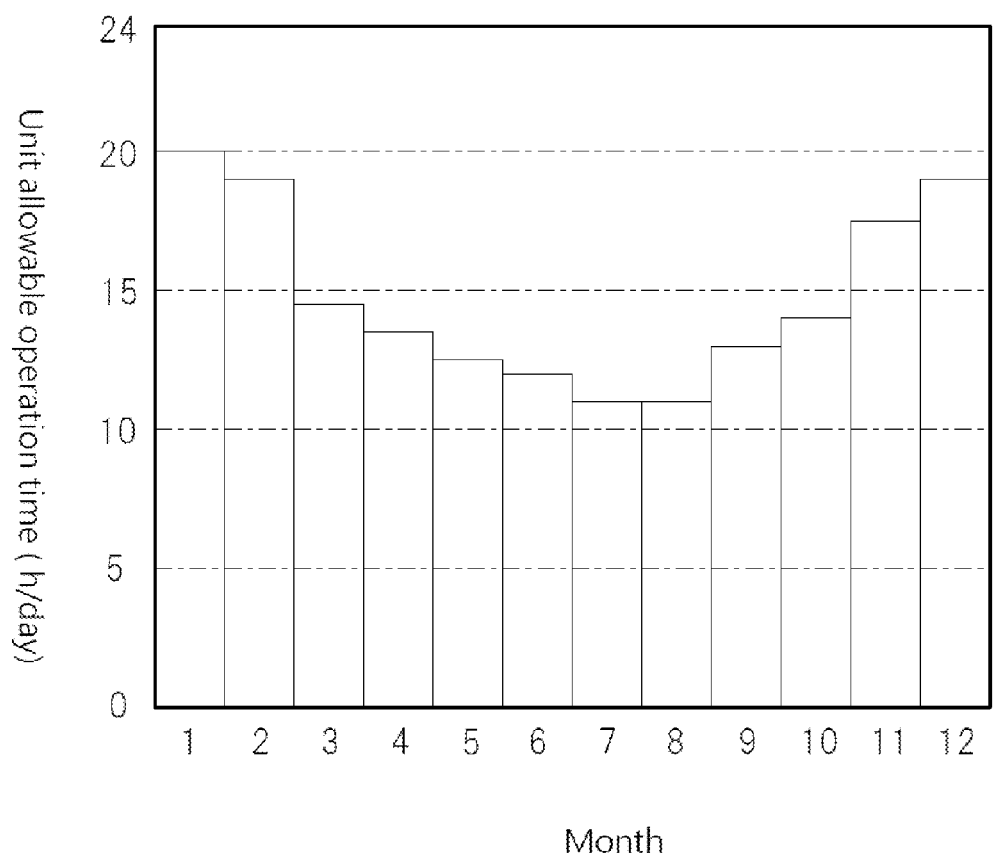
FIG. 3 is a graph showing an exemplary operation plan of the fuel cell system of FIG. 1.

FIG. 3 is a graph showing an exemplary operation plan of the fuel cell system 1A. In this graph, a horizontal axis indicates months of January to December, while a vertical axis indicates a unit allowable operation time. Now, the "unit allowable operation time" will be described. The fuel cell system 1A includes "consumable constituents" which are short in durable years and are assumed as being replaced in maintenance performed on a regular basis or after use for a relatively short time period, and constituents which are assumed as being used for a long time period unlike the consumable constituents (at least recognized as such by the user). The latter constituents include the fuel cell 60 and the reformer 61b, which are expected to withstand, for example, a continued use for at least about 10 years, i.e., guarantee durable years of about 10 years, so as to attain conformity with the user's recognition.

However, in actual cases, the total durable operation time of the fuel cell 60 is limited to, for example, 40000h, while the total durable number of times of operation of the reformer 61b is limited to, for example, 4000 times. Because of this, in a use state in which the fuel cell system 1A is operated for a long time every day, the operation time of the fuel cell system 1A reaches the total durable operation time before a passage of 10 years, and the end of the life of the fuel cell 60 comes, so that a desired performance cannot be achieved. Likewise, in another use state in which power generation and shut-down of the fuel cell system 1A are repeated many times in 1 day, the number of times of operation reaches the total durable number of times of operation before a passage of 10 years, and the end of the life of the reformer 61b comes, so that a desired performance cannot be achieved.

In view of the above, in the fuel cell system 1A of the present embodiment, "operation plan" is designed, in which an allowable operation time per unit time (e.g.: 1 day) or an allowable number of times of operation per unit time (e.g.: 1 day) are set. In the specification, the allowable operation time per unit time or the allowable number of times of operation per unit time, will be referred to as "unit allowable operation time" or "unit allowable number of times of operation," respectively. Although in the present embodiment, "1 day" is used as a unit time period, a desired time period such as 2 days, 3 days, 1 week, 10 days, or 1 month may be used as the unit period.

For example, as shown in FIG. 3, in a winter season in which the heat demand amount is great, the unit allowable operation time is set longer, and to a value in a range of about 17 to 20 [h/day] although this depends on the month. In a summer season in which the heat demand amount is less, the unit allowable operation time is set shorter, and to a value in a range of about 10 to 13 [h/day]. In a time period other than the winter season and the summer season, the unit allowable operation time is set to a value in a range of about 13 to 17 [h/day]. The user uses the fuel cell system 1A based on this operation plan in such a manner that only an operation, the operation time of which is equal to or shorter than the unit allowable operation time set on that day is permitted, and an operation, the operation time of which is longer than (exceeds) the unit allowable operation time is not permitted. This makes it possible to avoid that the total operation time of the fuel cell 60 reaches the total durable operation time before a passage of the durable years (e.g.: 10 years), and guarantee the durable years of 10 years.

The above stated set values of the unit allowable operation time are merely exemplary. The above stated set values of the unit allowable operation time in respective time periods may be changed suitably, depending on, for example, climatic environment of a region in which the fuel cell system 1A is installed, or a use state of the user. Hereinafter, an operation condition in which the operation time per unit period is equal to or shorter than the unit allowable operation time as described above will be referred to as "first operation condition".

The unit allowable number of times of operation is set to, for example, 1 [number of times/day] irrespective of a heat demand amount or a power demand amount. The user uses the fuel cell system 1A based on this operation plan in such a manner that only an operation, the number of times of operation which is equal to or less than the unit allowable number of times of operation which is set on that day, is permitted, and an operation, the number of times of operation, which is more than the unit allowable number of times of operation, is not permitted. This makes it possible to avoid that a total number of times of operation of the reformer 61b reaches the total durable number of times of operation (e.g.: 4000 times) before a passage of the durable years (e.g.: 10 years), and guarantee the durable years of 10 years. When the total durable number of times of the reformer 61b is 4000 times, about a surplus of 350 times remains in 10 years assuming that the reformer 61b is activated once every day. This surplus number of times is a margin.

The above stated set value of the unit allowable number of times of operation is merely exemplary, and may be changed suitably, depending on, for example, climatic environment of a region in which the fuel cell system 1A is installed, or a use state of the user. Hereinafter, an operation condition in which the number of times of per unit period is equal to or less than the unit allowable number of times of operation as will be described above will be referred to as "second operation condition".

Although the fuel cell 60 and the reformer 61b are exemplarily described above, the operation plan may be designed based on a total durable operation time or a total durable number of times of operation of an auxiliary device which is other than the reformer 61b and is not a consumable constituent.

As described above, in the fuel cell system 1A, the fuel cell 60 is controlled so as to satisfy at least one of the first operation condition and the second operation condition, during an operation (hereinafter, referred to as "normal operation") in which a general user uses the fuel cell system 1A. Thus, the durable years of the fuel cell 60 and the durable years of the reformer 61b are guaranteed. However, as an operation state of the operation of the fuel cell 60, there are special operation states (hereinafter referred to as "special operation") which are, for example, a trial operation performed at a time of installation of the fuel cell system 1A, or at a time of maintenance of the fuel cell system 1A. In the special operations, a continued operation for 2 to 3 h is estimated. Therefore, for example, in a case where the special operation is performed after a normal operation for 10 h is performed in July a summer season, a sufficient operation time cannot be ensured within the unit allowable operation time (see FIG. 3). Or, in a case where the special operation for 3 h is performed after the normal operation for 8 h is performed, the operation time reaches the unit allowable operation time. Therefore, the user cannot perform the normal operation on that day.

The fuel cell system 1A according to the present embodiment has an operation mode (hereinafter "normal mode") for controlling the fuel cell 60 such that at least one of the first operation condition and the second operation condition is satisfied, and an operation mode (hereinafter "special mode") for controlling the fuel cell 60 such that the operation is not limited by at least one of these operation conditions. Hereinafter, a control state in which the fuel cell 60 is operated in the normal mode or in the special mode which is switched, will be described in detail.

[Control State in Fuel Cell System]

Figure 4:
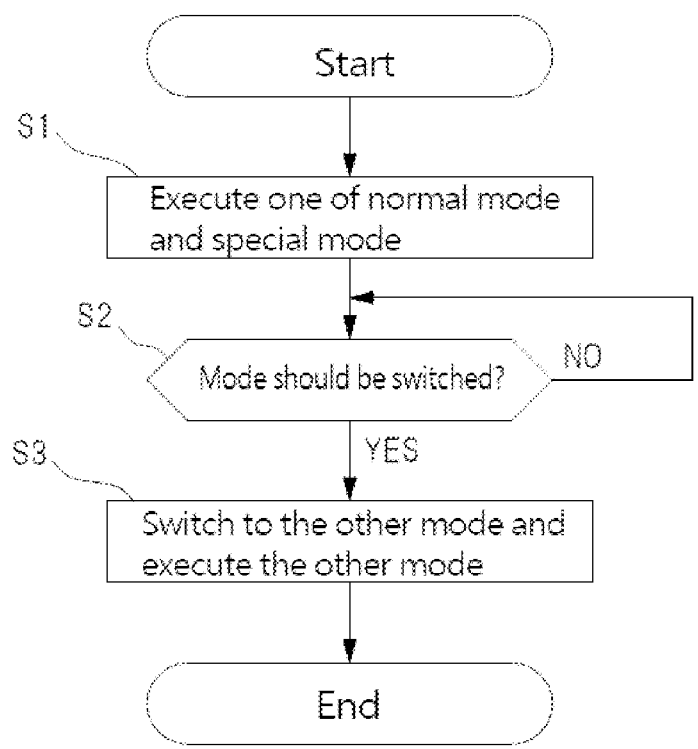
FIG. 4 is a flowchart showing a switching operation of an operation mode in the fuel cell system.

FIG. 4 is a flowchart showing a switching operation of an operation mode in the fuel cell system 1A. As shown in FIG. 4, in the fuel cell system 1A, the mode should be switched when a predetermined condition is satisfied (step S2: YES) in a state in which either the normal operation mode or the special mode is executed (step S1), and the other operation mode is executed (step S3). If it is determined that the mode should not be switched, a present operation mode is maintained (Step S2: NO).

Figure 5:
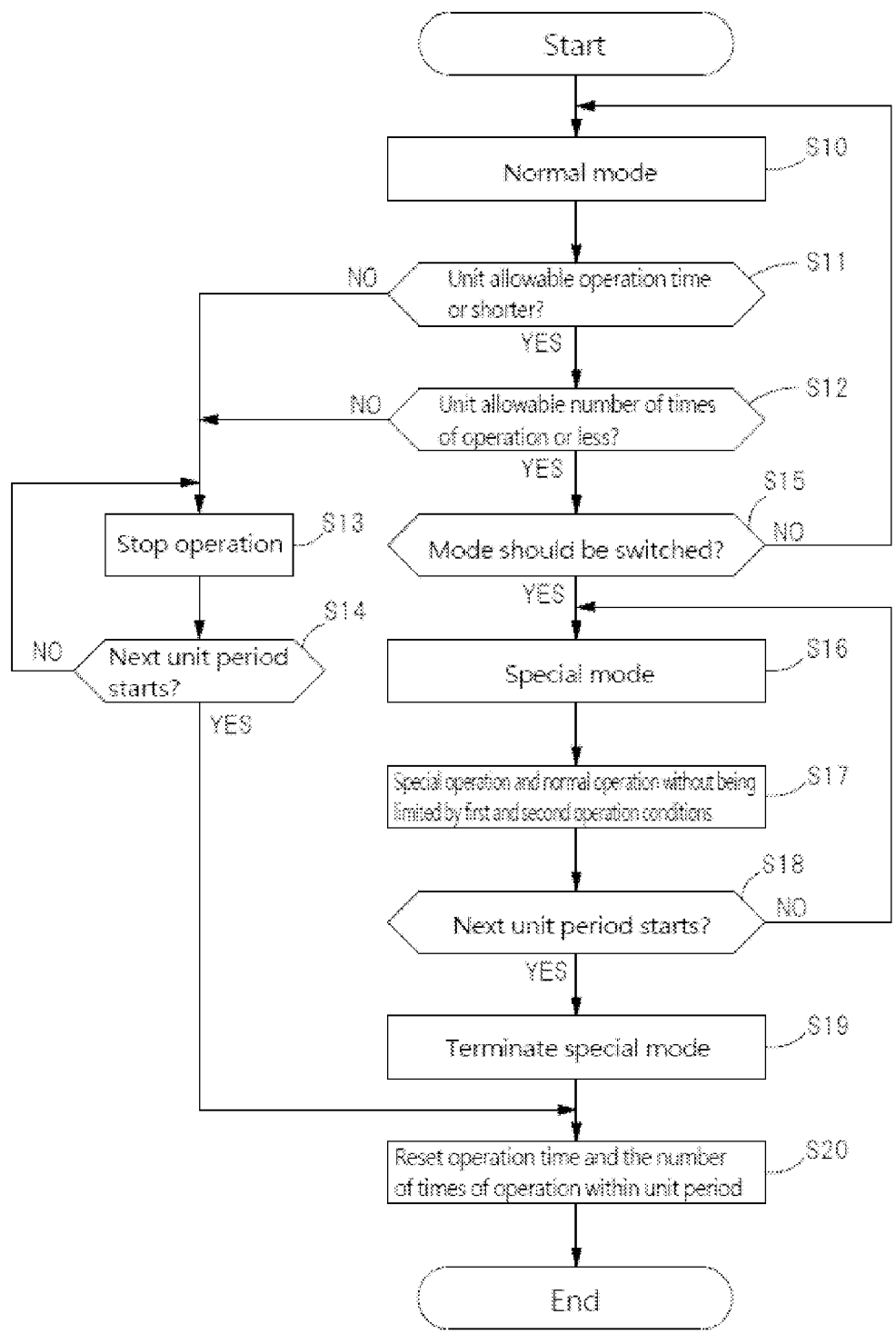
FIG. 5 is a flowchart showing another example of the switching operation of the operation mode in the fuel cell system.

FIG. 5 is a flowchart showing another example of the switching operation of the operation mode in the fuel cell system 1A. In this flow chart, specifically, an operation is described, in which the switching process of FIG. 4 is applied, and the operation mode is switched in one unit period. As shown in FIG. 5, the fuel cell system 1A is in the normal mode at a beginning of the unit period (1 day) (step S10). Then, an operation time and the number of times of operation of the fuel cell 60 within the same day are monitored. It is determined whether or not the operation time is equal to or shorter than the unit allowable operation time (step S11), and it is determined whether or not the number of times of operation is equal to or less than the unit allowable number of times of operation (step S12).

If it is determined that the operation time is longer than (exceeds) the unit allowable operation time (step S11: NO), or it is determined that the number of times of operation is more than (exceeds) the unit allowable number of times of operation (step S12: NO), the operation of the fuel cell 60 is not permitted, and stopped (step S13). This state is maintained until a next day has come (i.e., a next unit period starts) (step S14: NO). If it is determined that a next day has come (step S14: YES), the operation time and the number of times of operation which are monitored are reset (set to zero) (step S20), and the present flow ends. In the next unit period (the next day) thereafter, step S10 and the following steps are performed again.

In the above described manner, in the normal mode, it is possible to implement the operation of the fuel cell system 1A in which the durable years of the fuel cell 60 and the durable years of the auxiliary device such as the reformer 61b are guaranteed.

On the other hand, if it is determined that the operation time is equal to or shorter than the unit allowable operation time in the normal mode in step S11, or it is determined that the number of times of operation is equal to or less than the unit allowable number of times of operation in the normal mode in step S12, it is determined whether or not to the mode should be switched (step S15). The determination as to switching of the mode will be described later (see FIG. 6). If it is determined that the mode should not be switched (step S15: NO), step S10 and the following steps are repeated again. If it is determined that the mode should be switched (step S15: YES), the present normal mode is switched to the special mode (step S16).

After shifting to the special mode, the operation (special operation and normal operation) which are not limited by the first operation condition and/or second operation condition can be executed (step S17). This state is maintained until a next day comes (i.e., a next unit period starts) (step S18: NO). If it is determined that a next day has come (step S18: YES), the special mode is terminated (step S19), the operation time and the number of times of operation which are monitored are reset (set to zero) (step S20), and the present flow ends. In the next unit period (the next day) thereafter, step S10 and the following steps, i.e., control in the normal mode is executed again.

By executing the above described operation, for example, the normal mode is switched to the special mode within the same day (the same unit period), the special operation can be performed irrespective of the time of normal operation or the number of times of normal operation before the switching. After the special operation ends, the special mode continues until a next day has come (i.e., a next unit period starts). Therefore, the normal operation can be performed by the user. Even when the special mode is maintained until the end of a day, the special mode is switched to the normal mode automatically in the next day. As a result, in the next day, it is possible to carry out a proper operation plan in view of durable years of the fuel cell while limiting an operation time based on the first condition or the second condition.

[Determination as to Switching of Operation Mode]

Figure 6:
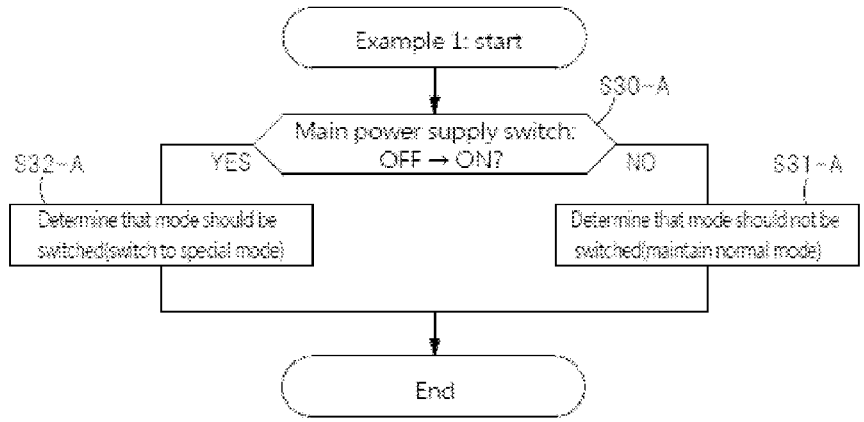
FIG. 6 is a flowchart showing processing for determining whether or not to switch an operation mode from a normal mode to a special mode in the fuel cell system.
Figure 6:
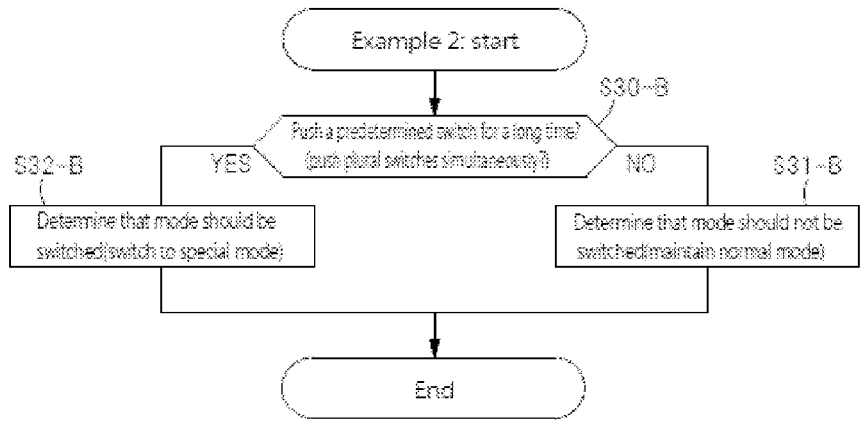
Figure 6:
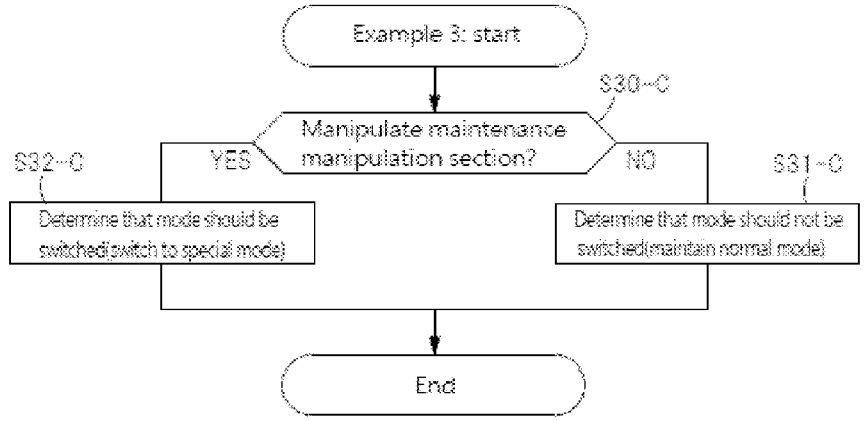

Next, a specific example of determination as to mode switching in step S15 will be described. FIG. 6 is a flowchart showing processing for determining whether or not to switch the operation mode from the normal mode to the special mode in the fuel cell system. Although three examples are shown in FIG. 6, these need not be exclusively adopted. In other words, the fuel cell system 1A of the present embodiment may adopt processing of any one of the three examples, or a combination of two or three examples.

Example 1 of FIG. 6 will be described. It is determined whether or not the main power supply switch 81a (see FIG. 1) has been switched from OFF to ON (step S30-A). If it is determined that the main power supply switch 81a has not been switched from OFF to ON, it is determined that the mode should not be switched (step S31-A), and the normal mode is maintained. On the other hand, if it is determined that the main power supply switch 81a has been switched from OFF to ON, it is determined that the mode should be switched (step S32-A), and the normal mode is switched to the special mode. That is, in the case of Example 1, application of a current to the controller 81 which is not supplied with electric power serves as a command signal indicating "the mode should be switched."

In the above described configuration, when an operator such as a maintenance operator performs the special operation such as the trial operation, the operator manipulates the main power supply switch 81a to switch it from OFF to ON, thereby enabling the fuel cell system 1A to be switched to the special mode. Thereafter, the special operation can be performed in a state in which the operation is not limited by the first operation condition and/or the second operation condition.

Example 2 of FIG. 6 will be described. It is determined whether or not a predetermined switch of the plurality of switches in the manipulation section 78a of the user manipulation device 78 has been pushed for a long time (step S30-B). If it is determined that the predetermined switch has not been pushed for a long time, it is determined that the operation mode should not be switched (step S31-B), and the normal mode is maintained. On the other hand, if it is determined that the predetermined switch has been pushed for a long time, it is determined that the operation mode should be switched (step S32-B), and the normal mode is switched to the special mode. The phrase "the predetermined switch has been pushed for a long time" refers to a state in which the predetermined switch continues to be pushed for a predetermined long time. That is, in the case of Example 2, a signal input to the controller 81 when the predetermined switch has been pushed for a long time, serves as a command signal indicating "the mode should be switched."

In the above described configuration, the operator can switch the fuel cell system 1A to the special mode by pushing the predetermined switch in the user manipulation device 78 for a long time. As represented by recitation in parenthesis in step S30-B, it may be determined whether or not the mode should be switched, based on presence or absence of a manipulation for pushing a plurality of predetermined switches simultaneously, instead of the manipulation for pushing the predetermined switch for a long time. Example 3 of FIG. 6 will be described later.

Figure 7:
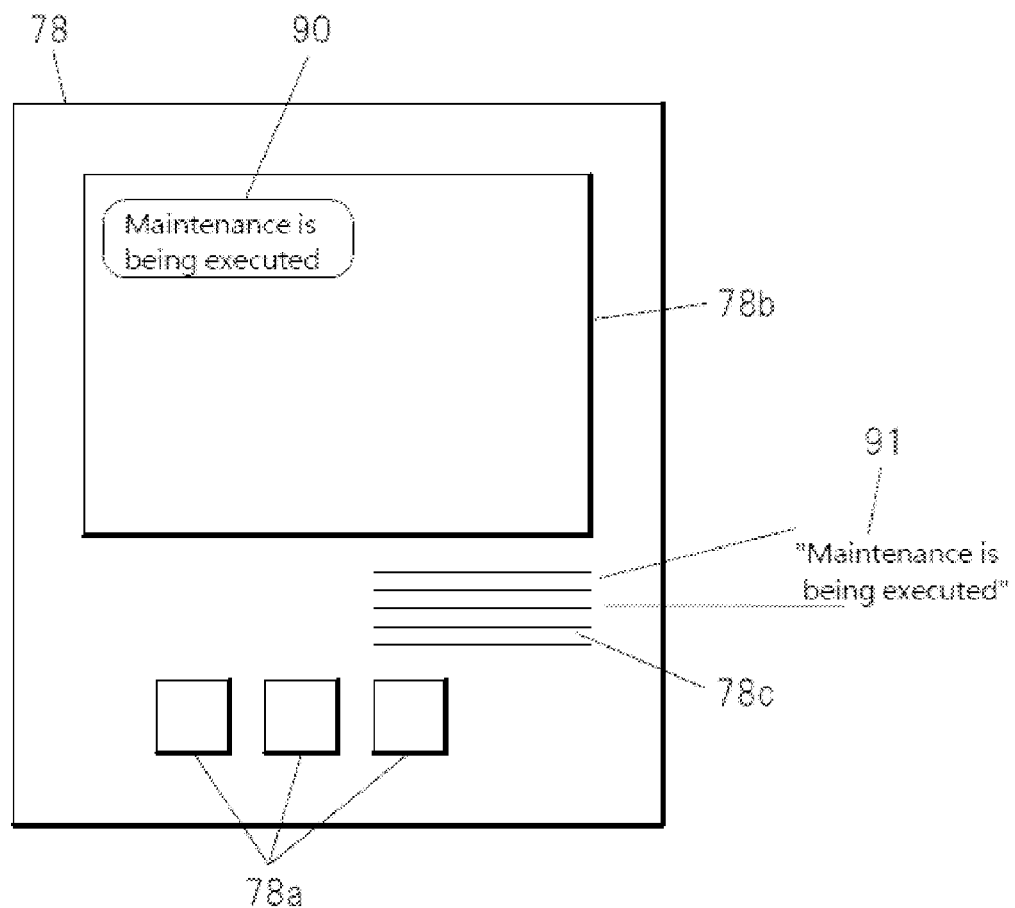
FIG. 7 is an enlarged view of a user manipulation device in the fuel cell system.

At the same time when switching of the mode occurs, the display section 78b and/or the notification section 78c in the user manipulation device 78 may output a signal indicating that the mode has been switched. This will be described with reference to FIG. 7 which is an enlarged view of the user manipulation device 78. The display section 78b in the user manipulation device 78 may display a message 90 composed of a character string stating, for example, "maintenance is being executed", at the same time when switching to the special mode occurs. Or, the notification section 78c may emit an audio assist message 91 stating "maintenance is being executed", at the same time when switching to the special mode occurs. The display of the message 90 and the emission of the audio assist message 91 may be performed simultaneously. The massage 90 may be continued to be displayed or the audio assist message 91 may be continued to be emitted for a certain time from a time point when the mode has been switched, or during execution of a time period of the special mode.

Embodiment 2

Figure 8:
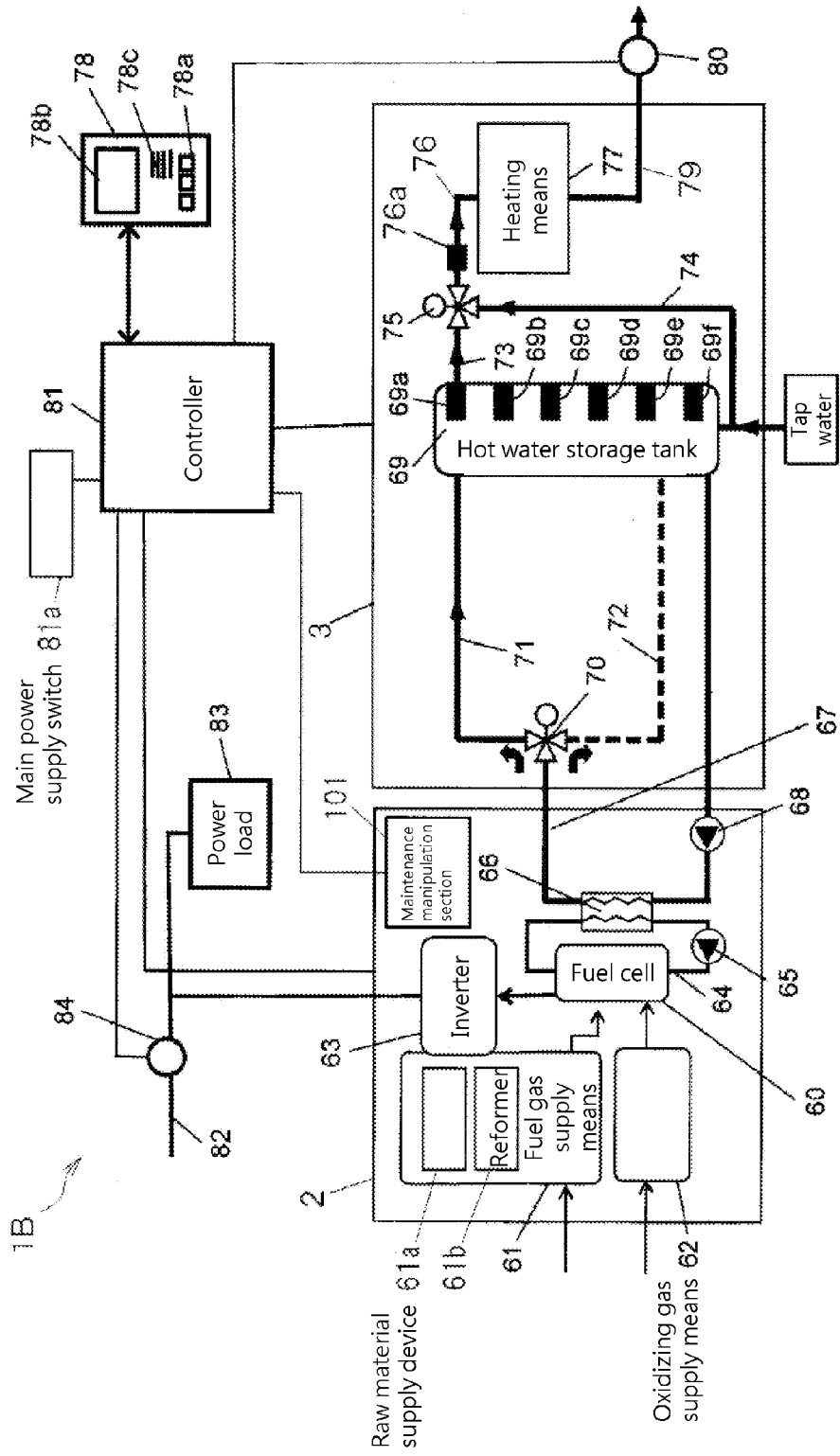
FIG. 8 is a schematic view showing a configuration of a fuel cell system according to Embodiment 2 of the present invention.

FIG. 8 is a schematic view showing a configuration of a fuel cell system according to Embodiment 2 of the present invention. A fuel cell system 1B of FIG. 8 is configured in such a manner that a maintenance manipulation section (operator manipulation section) 101 is added to the fuel cell system 1A of FIG. 1. The maintenance manipulation section 101 is manipulated only in the case where the operator or the like causes the fuel cell system 1B to perform the special operation, and is coupled to the controller 81 via a communication line.

The fuel cell system 1B configured as described above is able to execute the operation as described with reference to FIGS. 4 and 5 in Embodiment 1, and to determine whether or not to switch the mode as described with reference to Example 1 and Example 2 of FIG. 6. In addition, the fuel cell system 1B is able to determine whether or not to switch the mode like Example 3 of FIG. 6.

Example 3 of FIG. 6 will be described. In the fuel cell system 1B, the controller 81 determines whether or not the maintenance manipulation section 101 has been manipulated (step S30-C). If it is determined that the maintenance manipulation section 101 has not been manipulated, the controller 81 determines that the mode should not be switched (step S31-C), and maintains the normal mode. On the other hand, if it is determined that the maintenance manipulation section 101 has been manipulated, the controller 81 determines that the mode should be switched (step S32-C), and switches the operation mode from the normal mode to the special mode. That is, in the case of Example 3, a signal input to the controller 81 by manipulation of the maintenance manipulation section 101 serves as a command signal indicating "the mode should be switched."

In the above described configuration, when the operator such as the maintenance operator performs the special operation such as the trial operation, the operator manipulates the maintenance manipulation section 101, thereby enabling the fuel cell system 1B to be switched to the special mode. Thereafter, the special operation can be performed in a state in which the operation is not limited by the first operation condition and/or second operation condition. As described with reference to FIG. 7, when switching of the mode has occurred, the display section 78b and/or the notification section 78c in the user manipulation device 78 may output a signal indicating that the mode has been switched.

In Embodiment 1 and Embodiment 2, as shown in FIG. 5, only when it is determined that the operation time of the fuel cell 60 is equal to or shorter than the unit allowable operation time (step S11), and it is determined that the number of times of operation of the fuel cell 60 is equal to or less than the unit allowable number of times of operation (step S12), determination as to switching of the mode (step S15, see FIG. 6) is performed and the normal mode is switched to the special mode. Alternatively, for example, irrespective of the operation time and the number of times of operation in the fuel cell 60, the normal mode may be switched to the special mode, only based on the fact that a command signal indicating "the mode should be switched" is input to the controller 81 as described with reference to FIG. 6.

In the above described configuration, even if the unit allowable operation time and the unit allowable number of times of operation are used up within a particular unit period, the normal mode can be switched to the special mode within the same unit period, and the special operation such as the trial operation can be executed as necessary. There is a high possibility that especially in a latter half of the unit period, a remaining portion of the unit allowable operation time and a remaining portion of the unit allowable number of times of operation are lessened because of the use of the user before the latter half. Even in such a situation, the trial operation or the like in maintenance can be carried out surely, which is convenient.

Embodiment 3

In the above described operation, after the normal mode has been switched to the special mode, the special mode is maintained until a time point of an end of the corresponding unit period (i.e., until a next unit period starts) in which the normal mode is switched to the special mode. The present invention is not limited to this, and the special mode may be terminated based on predetermined conditions before the end of the unit period in which the normal mode is switched to the special mode.

For example, an upper limit time for which the special mode can be continued in one unit period may be set, and the special mode may be terminated at a time point when the upper limit time has passed after the normal mode has been switched to the special mode. Or, an upper limit number of times is set in the number of times the fuel cell 60 can be operated (i.e., the number of times the fuel cell 60 shifts from a shut-down state to a power generation state), and the special mode may be terminated at a time point when the upper limit number of times of the operation of the fuel cell 60 is used up after the normal mode has been switched to the special mode. In the present embodiment, this upper limit time is set as a period shorter than the unit period, and is referred to as "allowable special mode time." The upper limit number of times is set as the number of times which is equal to or less than the unit allowable number of times of operation and is referred to as "allowable number of times of special mode". Hereinafter, an operation for terminating the special mode on the basis of this determination criterion will be described.

Figure 9:
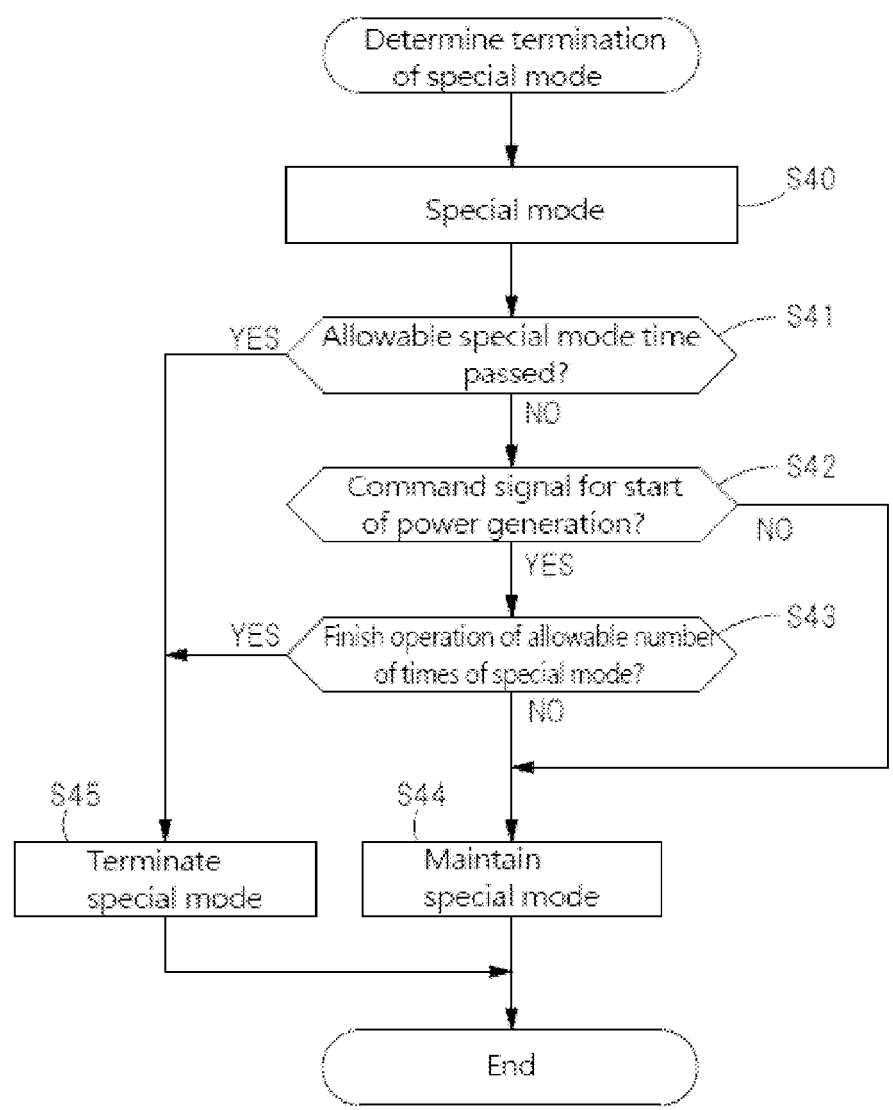
FIG. 9 is a flowchart showing an operation of the fuel cell system in a case where a special mode is terminated.

FIG. 9 is a flowchart showing the operation of the fuel cell system in a case where the special mode is terminated. Although the operation of the fuel cell system 1A will be exemplarily described, it may be applied to the fuel cell system 1B. As shown in FIG. 9, when the fuel cell system 1A enters the special mode (step S40), the controller 81 determines whether or not the allowable special mode time has passed in predetermined cycles (step S41). That is, the controller 81 measures a time upon the fuel cell system 1A entering the special mode, and compares this time to a predetermined allowable special mode time.

If it is determined that the time has reached the allowable special mode time (step S41: YES), the controller 81 terminates the special mode (step S45). On the other hand, if it is determined that the time has not reached the allowable special mode time (step S41: NO), then the controller 81 determines whether or not a command signal for switching the fuel cell 60 from the shut-down state to the power generation state has been input to the controller 81 (step S42). This command signal is input to the controller 81 by the user's or the operator's manipulation with respect to the manipulation section 78a of the user manipulation device 78 to command start of power generation.

If it is determined that the command signal has been input to the controller 81 (step S42: YES), the controller 81 determines whether or not the number of times of operation of the fuel cell 60 has reached allowable number of times of special mode (step S43). When the operation of the fuel cell 60 is started in response to the command signal, the controller 81 determines whether or not an accumulated number of times of operation has reached the allowable number of times of special mode after the normal mode has been switched to the special mode. If it is determined that the accumulated number of times of operation has not reached the allowable number of times of special mode (step S43: NO), the controller 81 maintains the present special mode (step S44). If it is determined that the command signal for start of power generation has not been input to the controller 81 in step S42 (step S42: NO), the controller 81 maintains the present special mode (step S44). On the other hand, if it is determined that the accumulated number of times of operation has reached the allowable number of times of special mode (step S43: YES), the controller 81 terminates the special mode (step S45).

The above stated series of flow is executed in, for example, the special mode shown in step S16 of FIG. 5. When the special mode is terminated as shown in step S45 of FIG. 9, the process moves to step S10 of FIG. 5 and the controller 81 starts the control in the normal mode.

In the above described configuration, in a case where there is a long time from when the normal mode is switched to the special mode until an end of the corresponding unit period, it becomes possible to prevent the fuel cell 60 from being operated for a long time, which would otherwise be caused by continuation of the special mode during the long time. Even in a case where there is a short time from when the normal mode is switched to the special mode until an end of the corresponding unit period, power generation and shut-down may be repeated many times within that short time. However, the increase in the number of times of such an operation can be avoided. Even in this case, the operation for a particular time (allowable special mode time) after the normal mode has been switched to the special mode, or the operation of a particular number of times (allowable number of times of special mode) is guaranteed. Therefore, the special operation or the normal operation which occurs thereafter can be carried out without a problem.

In a case where the special mode is forcibly terminated (step S45) when the operation time has reached the allowable special mode time or when the number of times of operation has reached the allowable number of times of special mode, the display section 78b or the notification section 78c in the user manipulation device 78 preferably output information indicating this. This enables the user to easily understand the operation time of the fuel cell or the number of times of operation of the fuel cell is limited based on the durable years. Therefore, the user can approve the operation of the fuel cell system performed based on the operation plan.

Embodiment 4

In Embodiment 3, a case has been described, in which the upper limit value of the continuation time of the special mode and the upper limit value of the number of times of operation in the special mode are set in every unit period, criterion used to determine whether or not to terminate the special mode is not limited to this. For example, operation times each of which exceeds the unit allowable operation time may be calculated for respective unit periods, and summed up. The special mode may be terminated when the summed-up value has reached a predetermined threshold. In other words, all operation times (unit excess times) corresponding to unit periods after installation of the system, each of which operation times exceeds the unit allowable operation time in one unit period, are accumulated and an accumulated time (accumulated excess time) is obtained. If the accumulated excess time has reached a predetermined upper limit value (upper-limit accumulated excess time), the controller 81 may terminate the special mode and switch the special mode to the normal mode.

The same applies to the number of times of operation. All number of times of operation (unit excess number of times) corresponding to unit periods after installation of the system, each of which number of times of operation exceeds the unit allowable number of times of operation in one unit period, are accumulated and an accumulated number of times (accumulated excess number of times) is obtained. If the accumulated excess number of times has reached a predetermined upper limit value (upper-limit accumulated excess number of times), the controller 81 may terminate the special mode and switch the special mode to the normal mode.

Figure 10:
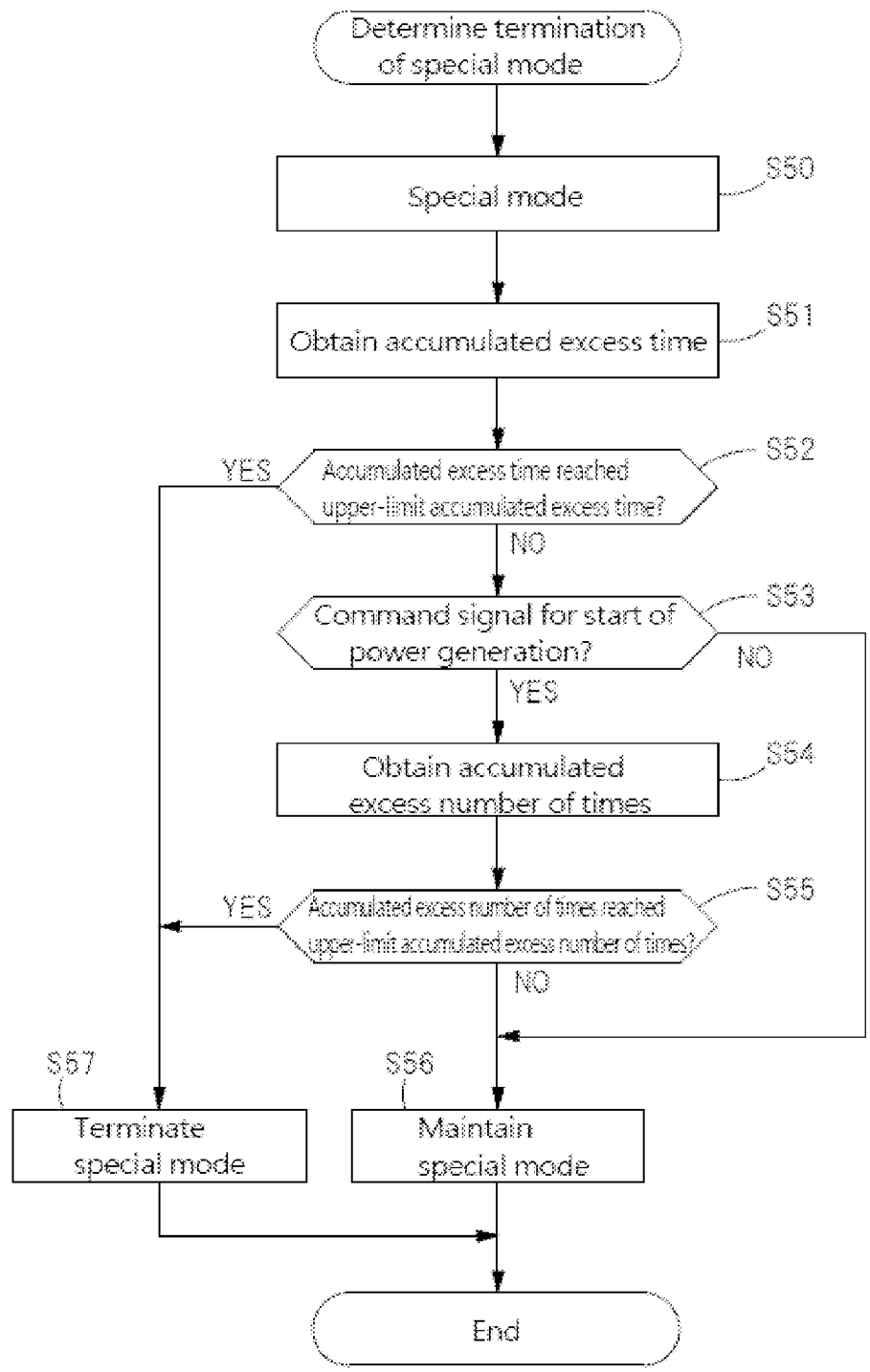
FIG. 10 is flowchart showing another operation of the fuel cell system in a case where the special mode is terminated.
Figure 11:
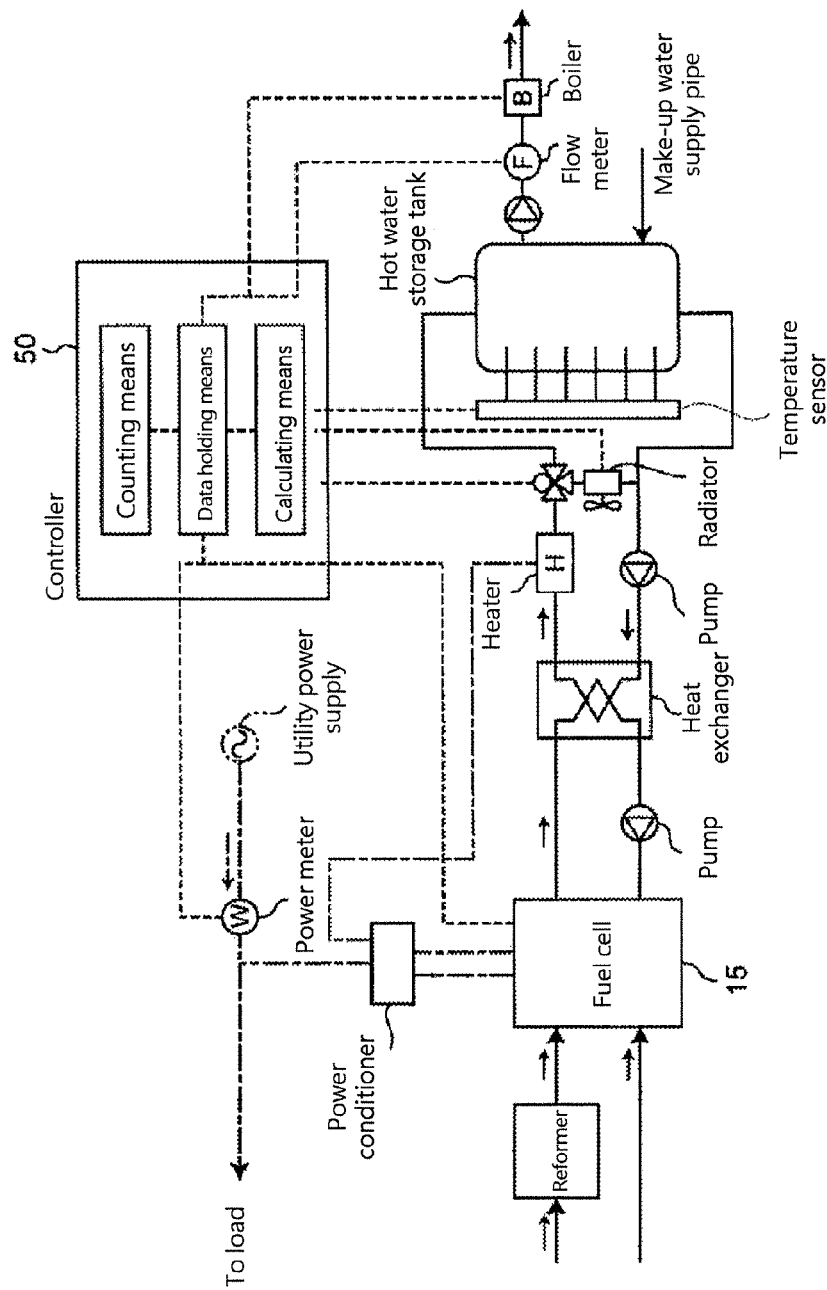
FIG. 11 is a schematic view showing a configuration of the conventional fuel cell system.

FIG. 10 is flowchart showing another operation of the fuel cell system in a case where the special mode is terminated. Although the operation of the fuel cell system 1A will be exemplarily described, it may be applied to the fuel cell system 1B. As shown in FIG. 10, when the fuel cell system 1A enters the special mode (step S50), the controller 81 measures an operation time (unit excess time) which exceeds the unit allowable operation time in a unit period in which the normal mode has been switched to the special mode, and sums up the present unit excess time and unit excess number of times measured in past unit periods to obtain an accumulated excess time (step S51). The controller 81 determines whether or not the accumulated excess time has reached the upper-limit accumulated excess time which is a threshold pre-stored in an internal memory, or the like of the controller 81 (step S52). Thus, if it is determined that the accumulated excess time has reached the upper-limit accumulated excess time (step S52: YES), the controller 81 terminates the special mode (step S57).

On the other hand, if it is determined that the accumulated excess time has not reached the upper-limit accumulated excess time (step S52: NO), the controller 81 determines whether or not a command signal for switching the fuel cell 60 from the shut-down state to the power generation state has been input to the controller 81 (step S53). If it is determined that the command signal has been input (step S53: YES), the controller 81 counts a unit excess number of times if the present operation exceeds the unit allowable number of times of operation in a unit period at a time point when the normal mode has switched to the special mode, and sums up the present unit excess number of times and unit excess number of times counted in past unit periods to obtain an accumulated excess number of times (step S54). The controller 81 determines whether or not the accumulated excess number of times has reached the upper-limit accumulated excess number of times (step S55). If it is determined that the accumulated excess number of times has reached the upper-limit accumulated excess number of times (step S55: YES), the controller 81 terminates the special mode (step S57). On the other hand, if it is determined that the accumulated excess number of times has not reached the upper-limit accumulated excess number of times (step S55: NO), or it is determined that the command signal has not been input (step S53: NO), the controller 81 maintains the present special mode (step S56).

In this configuration, even when the accumulated excess time or the accumulated excess number of times increases because of the fact that the operation in the special mode occurs frequently, the special mode can be switched to the normal mode forcibly if the accumulated excess time or the accumulated excess number of times has reached the threshold (upper-limit accumulated excess time or upper-limit accumulated excess number of times). Thus, it becomes possible to suppress a continued operation for a long time and guarantee the use of the fuel cell over durable years.

The controller 81 described in the above described embodiments may be implemented as programs which enable cooperation between hard resources such as electric/information devices including a CPU (or microcomputer), RAM, ROM, a memory/storage device, I/O, etc., a computer, a server, etc. The programs can be stored in storage media such as a magnetic medium and an optical medium and can be distributed using a communication line such as Internet. In this way, the programs can be distributed, updated and installed easily.

INDUSTRIAL APPLICABILITY

A fuel cell system of the present invention is applicable to business uses such as offices and factories as well as household uses.

REFERENCE SINGS LISTS 1A, 1B fuel cell system
2 power generation system
3 exhaust heat recovery system
60 fuel cell
61 fuel gas supply means
61b reformer
62 oxidizing gas supply means
66 heat exchanger
69 hot water storage tank
78 user manipulation device
78a manipulation section
78b display section (output section)
78c notification section (output section)
81 controller
81a main power supply switch
101 maintenance manipulation section (operator manipulation section)

The invention claimed is:

1. A fuel cell system comprising:
a fuel cell for generating electric power using a fuel gas and an oxidizing gas;
a controller for controlling at least start-up and shut-down of the fuel cell; and
an auxiliary device, at least shut-down and start-up of which is controlled by the controller;
wherein the controller operates the fuel cell in a normal mode or in a special mode which is switched by the controller;
in the normal mode, the fuel cell is operated so as to satisfy at least one of a first operation condition and a second operation condition, the first operation condition being a condition in which an operation time of the fuel cell per unit period is equal to or shorter than a unit allowable operation time defined based on a total durable operation time of at least one of the fuel cell and the auxiliary device, the second operation condition being a condition in which the number of times of operation of the fuel cell per unit time is equal to or less than a unit allowable number of times of operation defined based on a total durable number of times of operation of at least one of the fuel cell and the auxiliary device, and
in the special mode, the fuel cell is operated without being limited by both of the first operation condition and the second operation condition,
wherein the controller switches the normal mode to the special mode and operates the fuel cell in the special mode, in the same unit period as a unit period in which the fuel cell is operated in the normal mode; and
wherein after the unit period in which the fuel cell is operated in the special mode ends, the controller switches the special mode to the normal mode and operates the fuel cell in the normal mode in a next unit period.

2. The fuel cell system according to claim 1,
wherein when the controller executes the operation in the special mode,
the controller permits the fuel cell to be operated in the special mode such that the unit allowable operation time is exceeded, before a passage of an allowable special mode time set shorter than the unit period after the special mode is started, if the normal mode is set in the operation limited by the first operation condition, or
the controller permits the fuel cell to be operated in the special mode even when the number of times of operation in the unit period exceeds the unit allowable number of times of operation from when the special mode is started until allowable number of times of the special mode set to a value which is equal to or less than the unit allowable number of times of operation is used up, if the normal mode is set in the operation limited by the second operation condition.

3. The fuel cell system according to claim 1, wherein the unit allowable operation time is set shorter for a time period in one year in which a heat demand is less.

4. The fuel cell system according to claim 1, wherein the auxiliary device includes a hydrogen generator for generating a fuel gas supplied to the fuel cell.

5. A fuel cell system comprising:
a fuel cell for generating electric power using a fuel gas and an oxidizing gas;
a controller for controlling at least start-up and shut-down of the fuel cell;
an auxiliary device, at least shut-down and start-up of which is controlled by the controller; and
a main power supply switch for switching supply and cut-off of electric power from a utility power supply to at least the fuel cell and the auxiliary device;
wherein the controller operates the fuel cell in a normal mode or in a special mode which is switched by the controller;
in the normal mode, the fuel cell is operated so as to satisfy at least one of a first operation condition and a second operation condition, the first operation condition being a condition in which an operation time of the fuel cell per unit period is equal to or shorter than a unit allowable operation time defined based on a total durable operation time of at least one of the fuel cell and the auxiliary device, the second operation condition being a condition in which the number of times of operation of the fuel cell per unit time is equal to or less than a unit allowable number of times of operation defined based on a total durable number of times of operation of at least one of the fuel cell and the auxiliary device, and
in the special mode, the fuel cell is operated without being limited by both of the first operation condition and the second operation condition, and
wherein when the main power supply switch is switched from OFF to ON and the utility power supply starts supplying of the electric power, the controller permits the fuel cell to be operated in the special mode until an end of a unit period in which the main power supply switch is switched from OFF to ON.

6. A fuel cell system comprising:
a fuel cell for generating electric power using a fuel gas and an oxidizing gas;
a controller for controlling at least start-up and shut-down of the fuel cell; and an auxiliary device, at least shut-down and start-up of which is controlled by the controller;
wherein the controller operates the fuel cell in a normal mode or in a special mode which is switched by the controller;
in the normal mode, the fuel cell is operated so as to satisfy at least one of a first operation condition and a second operation condition, the first operation condition being a condition in which an operation time of the fuel cell per unit period is equal to or shorter than a unit allowable operation time defined based on a total durable operation time of at least one of the fuel cell and the auxiliary device, the second operation condition being a condition in which the number of times of operation of the fuel cell per unit time is equal to or less than a unit allowable number of times of operation defined based on a total durable number of times of operation of at least one of the fuel cell and the auxiliary device, and
in the special mode, the fuel cell is operated without being limited by both of the first operation condition and the second operation condition,
said fuel cell system further comprising an operator manipulation section manipulated by an operator to start the operation of the fuel cell in the special mode;
wherein when the operator manipulation section is manipulated by the operator and the operation in the special mode is started, the controller permits the fuel cell to be operated in the special mode until an end of a unit period in which the operator manipulation section is manipulated by the operator.

7. A fuel cell system comprising:
a fuel cell for generating electric power using a fuel gas and an oxidizing gas;
a controller for controlling at least start-up and shut-down of the fuel cell;
an auxiliary device, at least shut-down and start-up of which is controlled by the controller; and
a user manipulation section including a plurality of switches including a switch manipulated by a user to command an operation condition of the fuel cell;
wherein the controller operates the fuel cell in a normal mode or in a special mode which is switched by the controller;
in the normal mode, the fuel cell is operated so as to satisfy at least one of a first operation condition and a second operation condition, the first operation condition being a condition in which an operation time of the fuel cell per unit period is equal to or shorter than a unit allowable operation time defined based on a total durable operation time of at least one of the fuel cell and the auxiliary device, the second operation condition being a condition in which the number of times of operation of the fuel cell per unit time is equal to or less than a unit allowable number of times of operation defined based on a total durable number of times of operation of at least one of the fuel cell and the auxiliary device, and
in the special mode, the fuel cell is operated without being limited by both of the first operation condition and the second operation condition,
wherein when a predetermined switch in the user manipulation section is pushed for a predetermined long time, or when predetermined plural switches in the user manipulation section are pushed simultaneously, the controller permits the fuel cell to be operated in the special mode until an end of a unit period in which the predetermined switch is pushed for a long time or the predetermined plural switches are pushed simultaneously.

8. A fuel cell system comprising:
a fuel cell for generating electric power using a fuel gas and an oxidizing gas;
a controller for controlling at least start-up and shut-down of the fuel cell; and
an auxiliary device, at least shut-down and start-up of which is controlled by the controller;
wherein the controller operates the fuel cell in a normal mode or in a special mode which is switched by the controller;
in the normal mode, the fuel cell is operated so as to satisfy at least one of a first operation condition and a second operation condition, the first operation condition being a condition in which an operation time of the fuel cell per unit period is equal to or shorter than a unit allowable operation time defined based on a total durable operation time of at least one of the fuel cell and the auxiliary device, the second operation condition being a condition in which the number of times of operation of the fuel cell per unit time is equal to or less than a unit allowable number of times of operation defined based on a total durable number of times of operation of at least one of the fuel cell and the auxiliary device, and
in the special mode, the fuel cell is operated without being limited by both of the first operation condition and the second operation condition,
wherein the controller stores an accumulated excess time derived by accumulating unit excess times in unit periods having passed, each of the unit excess times exceeding the unit allowable operation time in one unit period, and an accumulated excess number of times derived by accumulating unit excess number of times in unit periods having passed, each of the unit excess number of times exceeding the unit allowable number of times of operation in one unit period; and
wherein in at least one of a case where the accumulated excess time has reached a predetermined upper-limit accumulated excess time and a case where the accumulated excess number of times has reached a predetermined upper-limit accumulated excess number of times, the controller forcibly switches the special mode to the normal mode.

9. The fuel cell system according to claim 8, further comprising:
a user manipulation section including a plurality of switches including a switch manipulated by the user to command an operation condition of the fuel cell;
wherein the user manipulation section includes:
an output section for outputting a voice or displaying information commanding switching from the special mode to the normal mode in response to a command issued by the controller, in at least one of a case where the accumulated excess time has reached the predetermined upper-limit accumulated excess time and a case where the predetermined accumulated excess number of times has reached the predetermined upper-limit accumulated excess number of times, and the controller forcibly switches the special mode to the normal mode.

10. A method of operating a fuel cell system including a fuel cell for generating electric power using a fuel gas and an oxidizing gas, and an auxiliary device, the method comprising the steps of:
operating the fuel cell in a normal mode in which the fuel cell is operated so as to satisfy at least one of a first operation condition and a second operation condition, the first operation condition being a condition in which an operation time of the fuel cell per unit period is equal to or shorter than a unit allowable operation time defined based on a total durable operation time of at least one of the fuel cell and the auxiliary device, the second operation condition being a condition in which the number of times of operation of the fuel cell per unit time is equal to or less than a unit allowable number of times of operation defined based on a total durable number of times of operation of at least one of the fuel cell and the auxiliary device;

operating the fuel cell in a special mode in which the fuel cell is operated without being limited by both of the first operation condition and the second operation condition;

switching the operation between the normal mode and the special mode;

switching the normal mode to the special mode and operating the fuel cell in the special mode, in the same unit period as a unit period in which the fuel cell is operated in the normal mode; and after the unit period in which the fuel cell is operated in the special mode ends, switching the special mode to the normal mode and operating the fuel cell in the normal mode in a next unit period.

* * * * *